(12) United States Patent  
Du et al.

(10) Patent No.: US 8,929,276 B2
(45) Date of Patent: Jan. 6, 2015

(54) REPEATER WPS CONNECTION METHOD AND APPARATUS

(71) Applicant: Huawei Device Co., Ltd., Shenzhen, Guangdong (CN)

(72) Inventors: Wei Du, Wuhan (CN); Weihong Wang, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 104 days.

(21) Appl. No.: 13/720,658

(22) Filed: Dec. 19, 2012

(65) Prior Publication Data

US 2013/0107796 A1  May 2, 2013

Related U.S. Application Data

(63) Continuation of application No. PCT/CN2011/074745, filed on May 27, 2011.

(51) Int. Cl.
   *H04B 7/14* (2006.01)
   *H04W 88/04* (2009.01)
   *H04W 76/02* (2009.01)
   *H04W 84/04* (2009.01)

(52) U.S. Cl.
   CPC ............ *H04W 88/04* (2013.01); *H04W 76/023* (2013.01); *H04W 84/047* (2013.01)
   USPC ....................................................... 370/315

(58) Field of Classification Search
   None
   See application file for complete search history.

(56) References Cited

U.S. PATENT DOCUMENTS

| 2004/0185845 | A1* | 9/2004 | Abhishek et al. | 455/422.1 |
| 2007/0026856 | A1* | 2/2007 | Krantz et al. | 455/426.1 |
| 2008/0037444 | A1 | 2/2008 | Chhabra | |
| 2009/0067441 | A1 | 3/2009 | Ansari et al. | |
| 2011/0044208 | A1* | 2/2011 | Yun et al. | 370/254 |

(Continued)

FOREIGN PATENT DOCUMENTS

| CN | 101523376 A | 9/2009 |
| CN | 101616017 A | 12/2009 |
| KR | 20090030629 A | 3/2009 |

OTHER PUBLICATIONS

Communication from a foreign counterpart application, International Application No. PCT/CN2011/074745, International Search Report dated Mar. 1, 2012, 3 pages.

(Continued)

*Primary Examiner* — Otis L Thompson, Jr.
(74) *Attorney, Agent, or Firm* — Conley Rose, P.C.; Grant Rodolph; Nicholas K. Beaulieu (57) ABSTRACT

Embodiments of the present invention provide a Repeater WPS connection method and apparatus, which relate to the field of wireless networks and can complete WPS connections of a Client side and an AP side of a Repeater device in one Repeater WPS PBC operation, thereby simplifying the flow of a WPS connection operation. The method of the present invention includes: when a WPS button on a wireless Repeater device is activated, first establishing a connection between a Client side of the Repeater device and an uplink AP device, and obtaining wireless configuration information of the uplink AP device; and synchronizing the wireless configuration information to an AP side of the Repeater device, and then establishing a connection between the AP side of the Repeater device and an STA device. The present invention is mainly applied in the process of the Repeater WPS connection.

12 Claims, 5 Drawing Sheets

(56) References Cited

U.S. PATENT DOCUMENTS

| | | | |
|---|---|---|---|
| 2011/0110521 A1* | 5/2011 | Yang et al. | 380/270 |
| 2011/0252439 A1* | 10/2011 | Lai et al. | 725/25 |
| 2011/0264904 A1* | 10/2011 | Hua et al. | 713/150 |
| 2012/0030466 A1* | 2/2012 | Yamaguchi | 713/168 |

OTHER PUBLICATIONS

Communication from a foreign counterpart application, International Application No. PCT/CN2011/074745, English Translation, International Search Report dated Mar. 1, 2012, 4 pages.

* cited by examiner

REPEATER WPS CONNECTION METHOD AND APPARATUS

CROSS-REFERENCE TO RELATED APPLICATION

This application is a continuation of International Application No. PCT/CN2011/074745, filed on May 27, 2011, which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of wireless networks, and in particular, to a Repeater Wi-Fi Protected Setup (WPS) connection method and apparatus.

BACKGROUND

With the rapid development of network accessing services based on wireless broadband, wireless home gateway products develop rapidly and users have higher and higher requirements for the performance of products, especially for the strength and coverage range of wireless signals. However, due to factors such as the layout of a room and the thickness of a wall, the coverage range of wireless signals is undesirable at present. Through wireless Repeater Access Point-Client (AP-Client) technologies, a home wireless network may be constructed to extend wireless signals to solve the problem of wireless coverage. In the process of implementing the Repeater AP-Client technology, WPS is an absolutely necessary step.

In the prior art, a method of performing the WPS is presetting a working manner of Repeater Wi-Fi Protected Setup Push Button Configuration (WPS PBC), so as to implement a WPS connection of an Access Point (AP) side or a Client side of the Repeater device.

In the process of implementing the WPS connection of the AP side or Client side of the Repeater device, the inventors find that the prior art at least has the following problem: the WPS connection of the AP side and Client side of the Repeater device cannot be completed in one Repeater WPS PBC operation, and therefore the operability is poor.

SUMMARY

Embodiments of the present invention provide a Repeater WPS connection method and apparatus, capable of completing WPS connections of a Client side and an AP side of a Repeater device in one Repeater WPS PBC operation, thereby simplifying the flow of a WPS connection operation and making a user operation simpler and more convenient.

In order to achieve the foregoing object, the embodiments of the present invention adopt the following technical solutions:

In an aspect, an embodiment of the present invention provides a Repeater WPS connection method that includes: when a WPS button on a wireless Repeater device is activated, establishing a connection between a Client side of the Repeater device and an uplink AP device; obtaining wireless configuration information of the uplink AP device; and synchronizing the wireless configuration information to an AP side of the Repeater device, enabling a WPS negotiation of the AP side of the Repeater device, and establishing a connection between the AP side of the Repeater device and an enrollee station (STA) device.

In another aspect, an embodiment of the present invention provides a Repeater WPS connection apparatus that includes: a first connection unit configured to: when a WPS button on a wireless Repeater device is activated, establish a connection between a Client side of the Repeater device and an uplink AP device; an obtaining unit configured to obtain wireless configuration information of the uplink AP device; and a second connection unit configured to: synchronize the wireless configuration information obtained by the obtaining unit to an AP side of the Repeater device, enable a WPS negotiation of the AP side of the Repeater device, and establish a connection between the AP side of the Repeater device and an STA device.

In technical solutions provided in the embodiments of the present invention, when a WPS button on a wireless Repeater device is activated and it is determined that a WPS working manner is a Client mode, a connection between a Client side of the Repeater device and an uplink AP device is established first and wireless configuration information of the uplink AP device is obtained; then, the wireless configuration information is synchronized to an AP side of the Repeater device, and a connection between the AP side of the Repeater device and an STA device is established. Compared with the prior art where a WPS connection of only one side (e.g., the AP side or the Client side) of the Repeater device is established when the WPS button on the Repeater device is activated once, the embodiment of the present invention can complete the WPS connection of the Client side and the WPS connection of the AP side of the Repeater device one after another when the Repeater WPS PBC operation is performed once, thereby simplifying the flow of the WPS connection operation and making the user operation simpler and more convenient.

BRIEF DESCRIPTION OF THE DRAWINGS

To illustrate the technical solutions in embodiments of the present invention more clearly, the following briefly describes the accompanying drawings needed for describing the embodiments or the prior art. Apparently, the accompanying drawings merely show some embodiments of the present invention, and persons skilled in the art may derive other drawings from these accompanying drawings without creative efforts.

DETAILED DESCRIPTION

The following clearly describes the technical solutions according to the embodiments of the present invention with reference to the accompanying drawings in the embodiments of the present invention. Apparently, the described embodiments are merely a part rather than all of the embodiments of the present invention. All other embodiments obtained by persons skilled in the art based on the embodiments of the present invention without creative efforts shall fall within the protection scope of the present invention.

Embodiment 1

Figure 1:
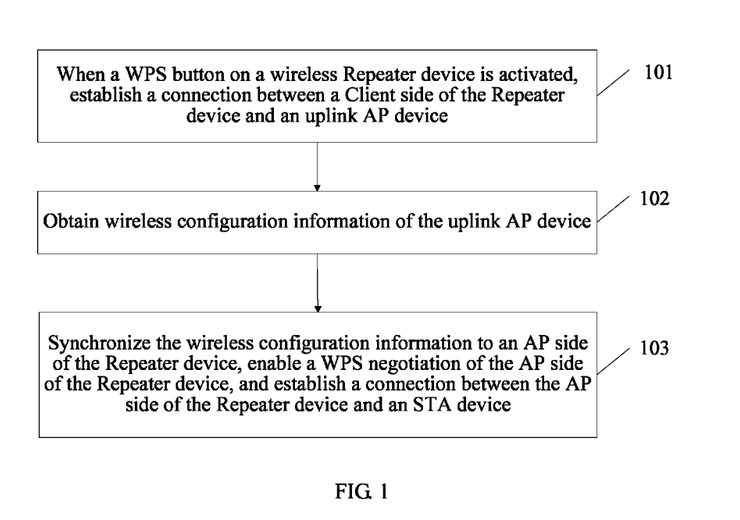
FIG. 1 is a flow chart of a Repeater WPS connection method in Embodiment 1 of the present invention.

An embodiment of the present invention provides a Repeater WPS connection method. As shown in FIG. 1, the method includes:

101: When a WPS button on a wireless Repeater device is activated, establish a connection between a Client side of the Repeater device and an uplink AP device.

Figure 2:
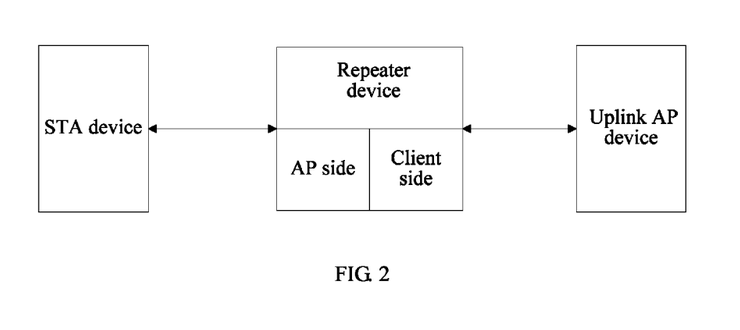
FIG. 2 is a flow chart of a Repeater WPS connection method in Embodiment 2 of the present invention.

It should be noted that, when an STA device communicates with an uplink AP device (e.g., a Router), due to a long distance or an obstacle between the STA device and the uplink AP device, signals are too weak, so that the STA device cannot access the uplink AP device normally. To enable the STA device to communicate with the uplink AP device normally, a Repeater device is inserted between the STA device and the Router. As shown in FIG. 2, the Repeater device is equivalent to a device including an AP device (e.g., an AP device with a built-in independent wireless configuration) and an STA device, and includes an AP side and a Client side. First, the Client side of the Repeater device needs to be connected to the uplink AP device, which may be implemented through a WPS mode or another mode. During the implementation of establishing a WPS connection of the Client side of the Repeater device, the Client side of the Repeater device may obtain wireless configuration information of the uplink AP device. After being successfully connected to the uplink AP device, the Client side of the Repeater device synchronizes the wireless configuration information of the uplink AP device to the AP side of the Repeater device, so that the AP side of the Repeater device has a WPS function.

The WPS is capable of helping users automatically set a network name (e.g., a service set (SSID)) and configure a powerful Wi-Fi Protected Access (WPA) network security protection system having data encoding and authentication functions.

102: Obtain wireless configuration information of the uplink AP device.

It should be noted that, when the connection between the Client side of the Repeater device and the uplink AP device is established, the Repeater device performs interactive communication with the uplink AP device, and during interactive communication, obtains wireless configuration information of the uplink AP device, where the wireless configuration information may be, but is not limited to, information such as an SSID and a wireless authentication and encryption algorithm.

103: After the connection between the Client side of the Repeater device and the uplink AP device is established, synchronize the wireless configuration information to the AP side of the Repeater device, enable a WPS negotiation of the AP side of the Repeater device, and establish a connection between the AP side of the Repeater device and the STA device.

In the embodiment of the present invention, when a WPS button on a wireless Repeater device is activated, a connection between a Client side of the Repeater device and an uplink AP device is established first and wireless configuration information of the uplink AP device is obtained. Then, the wireless configuration information is synchronized to an AP side of the Repeater device, and a connection between the AP side of the Repeater device and an STA device is established. Compared with the prior art where a WPS connection of only one side (e.g., the AP side or the Client side) of the Repeater device is established when the WPS button on the Repeater device is activated once, the embodiment of the present invention can complete the WPS connection of the Client side and the WPS connection of the AP side of the Repeater device one after another when the Repeater WPS PBC operation is performed once, thereby simplifying the flow of the WPS connection operation and making the user operation simpler and more convenient.

Embodiment 2

An embodiment of the present invention provides a Repeater WPS connection method.

In this embodiment, the WPS working manner may be one mode only, that is, a wireless Repeater access device may have an AP-Client mode only or a Client mode only. In the case of only one mode, in this embodiment, a step of setting and determining a WPS working manner of the Repeater access device may not be needed.

Definitely, two modes may also exist at the same time, that is, the AP-Client mode and the Client mode. In this case, which mode a current mode is needs to be set and determined.

In this embodiment, no matter which mode a current WPS mode of the wireless Repeater access device is, the steps in Embodiment 1 need to be performed, that is, the WPS modes do not limit the present invention.

The description is made in the following in the case that the wireless Repeater access device has two modes at the same time.

Figure 3:
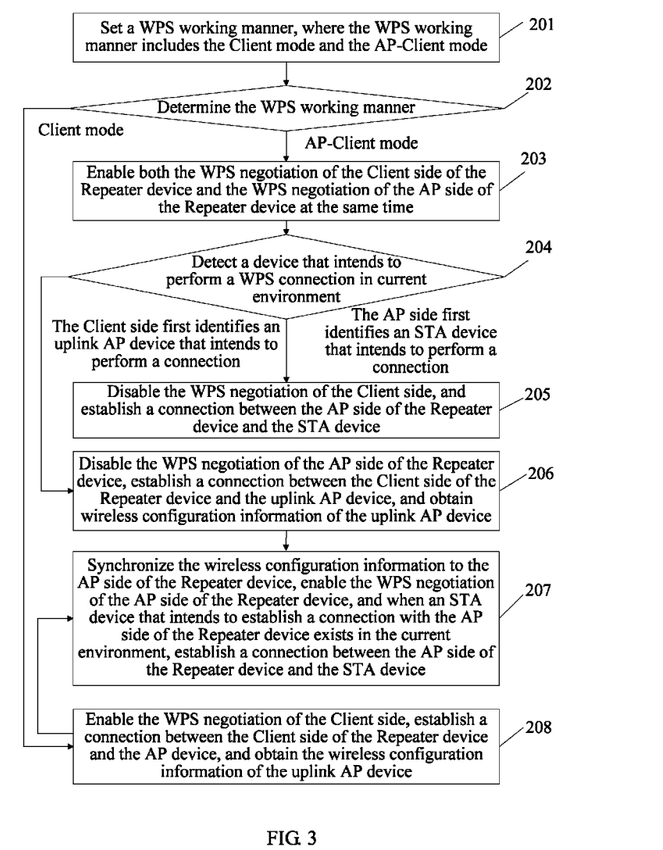
FIG. 3 is a schematic diagram of a networking manner of a Repeater device in Embodiment 2 of the present invention.

As shown in FIG. 3, the method includes:

201: Set a WPS working manner, where the WPS working manner includes a Client mode and an AP-Client mode.

Figure 4:
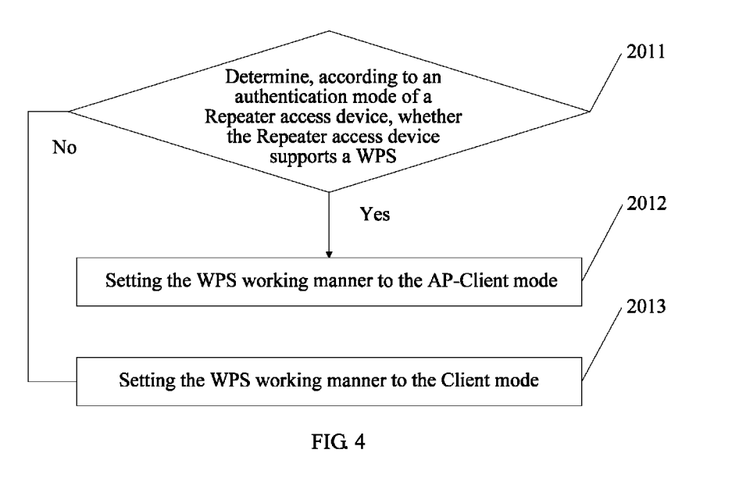
FIG. 4 is a flow chart of a method for setting a WPS working manner in Embodiment 2 of the present invention.

The setting the WPS working manner may be implemented through the following method shown in FIG. 4, which includes:

2011: Determine, according to an authentication mode of a Repeater access device, whether the Repeater access device supports a WPS; if it is determined, according to the authentication mode of the Repeater access device, that the Repeater access device supports the WPS, perform step 2012; if it is determined, according to the authentication mode of the Repeater access device, that the Repeater access device does not support the WPS, perform step 2013.

The determining, according to the authentication mode of the Repeater access device, whether the Repeater access device supports the WPS is: when the authentication mode of the Repeater access device is a Wi-Fi Protected Access Pre-Shared Key (WAP-PSK) mode or a Wi-Fi Protected Access II (WPA2-PSK) mode, determining that the Repeater access device supports the WPS.

2012: Determine that the WPS working manner is the AP-Client mode.

2013: Determine that the WPS working manner is the Client mode.

It should be noted that, when the WPS working manner is set, the method is not limited to the foregoing method, the working manner may be set through an existing manual setting method, which is not limited in the embodiment of the present invention.

202: When a WPS button on the wireless Repeater device is activated, the Repeater device determines the WPS working manner, where the WPS working manner includes the Client mode and the AP-Client mode; if it is determined that the WPS working manner is the AP-Client mode, perform step 203; and if it is determined that the WPS working manner is the Client mode, perform step 208.

In the Client mode, only a WPS negotiation of a Client side of the Repeater device is enabled in one WPS button operation; in the AP-Client mode, both a WPS negotiation of the Client side and a WPS negotiation of an AP side of the Repeater device are enabled at the same time in one WPS button operation.

203: The Repeater device enables both the WPS negotiation of the Client side of the Repeater device and the WPS negotiation of the AP side of the Repeater device at the same time.

The enabling the WPS negotiation of the Client side of the Repeater device enables an interconnection operation between the Client side of the Repeater device and an uplink AP device; and the enabling the WPS negotiation of the AP side of the Repeater device enables an interconnection operation between the AP side of the Repeater device and an STA device.

204: The Repeater device detects a device that intends to perform a WPS connection in the current environment; if the AP side of the Repeater device first identifies an STA device that intends to perform a connection, perform step 205, and if the Client side of the Repeater device first identifies an uplink AP device that intends to perform a connection, perform step 206.

The STA device that intends to perform a connection is an STA device which prepares to be connected to the AP side of the Repeater device.

205: Disable the WPS negotiation of the Client side of the Repeater device, restore a connection between the Client side of the Repeater device and the uplink AP device, and establish a connection between the AP side of the Repeater device and the STA device; and end the WPS connection operation.

It should be noted that, when the WPS working manner is the AP-Client mode and after the WPS negotiation of the Client side of the Repeater device is enabled, the Client side of the Repeater device is disconnected from the original uplink AP device and then attempts to be connected to another uplink AP device. At this time, if it is first detected that the AP side of the Repeater device has WPS connection interaction with the STA device, the connection between the Client side of the Repeater device and the original uplink AP device needs to be restored, to ensure that, after the AP side of the Repeater device is successfully connected to the STA device, the STA device may immediately communicate with the uplink AP through the Repeater device.

206: Disable the WPS negotiation of the AP side of the Repeater device, establish a connection between the Client side of the Repeater device and the uplink AP device, and obtain wireless configuration information of the uplink AP device.

207: After the connection between the Client side of the Repeater device and the uplink AP device is established, synchronize the wireless configuration information to the AP side of the Repeater device, enable the WPS negotiation of the AP side of the Repeater device, and when an STA device that intends to establish a connection with the AP side of the Repeater device exists in the current environment, establish a connection between the AP side of the Repeater device and the STA device; end the WPS connection operation.

208: Enable the WPS negotiation of the Client side, establish a connection between the Repeater device and the AP device of the Client side, obtain the wireless configuration information of the uplink AP device, and perform step 207.

It should be noted that, in the embodiment of the present invention, in the whole process of the Repeater WPS connection, the process and status of the Repeater WPS connection may be displayed through light-emitting diodes (LEDs) with different colors or flicker frequencies, which may be specifically set according to habits of users and is not limited by the embodiment of the present invention.

In the embodiment of the present invention, when a WPS button on a wireless Repeater device is activated, and it is determined that a WPS working manner is a Client mode, or it is determined that the WPS working manner is an AP-Client mode and the Client side of the Repeater device first identifies an uplink AP device that intends to perform a connection, that is, no matter which current mode the wireless Repeater device is in, the wireless Repeater device needs to establish a connection between the Client side of the Repeater device and the uplink AP device and obtain wireless configuration information of the uplink AP device. Then, the wireless configuration information is synchronized to an AP side of the Repeater device, and a connection between the AP side of the Repeater device and the STA device is established. Compared with the prior art where a WPS connection of only one side (e.g., the AP side or the Client side) of the Repeater device is established when the WPS button on the Repeater device is activated once, the embodiment of the present invention can complete the WPS connection of the Client side and the WPS connection of the AP side of the Repeater device one after another when the Repeater WPS PBC operation is performed once, thereby simplifying the flow of the WPS connection operation and making the user operation simpler and more convenient.

Furthermore, in the embodiment of the present invention, before the WPS working manner is determined, the Repeater device may further determine and set the WPS working manner according to the authentication mode of the Repeater access device, thereby avoiding an operation of manually setting the WPS working manner, so as to implement the function of automatically identifying the Repeater WPS PBC working manner, thereby making the whole process more automatic and further simplifying the user operation.

Embodiment 3

Figure 5:
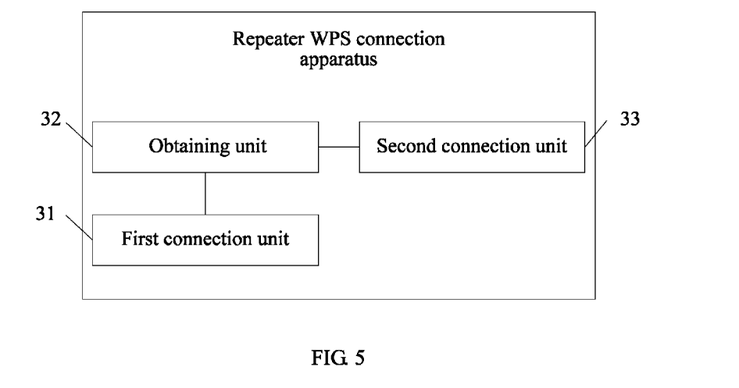
FIG. 5 is a component block diagram of a Repeater WPS connection apparatus in Embodiment 3 of the present invention.

An embodiment of the present invention provides a Repeater WPS connection apparatus. As shown in FIG. 5, the apparatus includes a first connection unit 31, an obtaining unit 32, and a second connection unit 33.

The first connection unit 31 is configured to: when a WPS button on a wireless Repeater device is activated, establish a connection between a Client side of the Repeater device and an uplink AP device.

The obtaining unit 32 is configured to obtain wireless configuration information of the uplink AP device. It should be noted that, when the first connection unit 31 establishes the connection between the Client side of the Repeater device and the uplink AP device, the Repeater device may perform interactive communication with the uplink AP device, and during the interactive communication, obtain wireless configuration information of the uplink AP device, where the wireless configuration information may be, but is not limited to, information such as an SSID and a wireless authentication and encryption algorithm.

The second connection unit 33 is configured to synchronize the wireless configuration information to an AP side of the Repeater device, enable a WPS negotiation of the AP side of the Repeater device, and establish a connection between the AP side of the Repeater device and an STA device.

Figure 6:
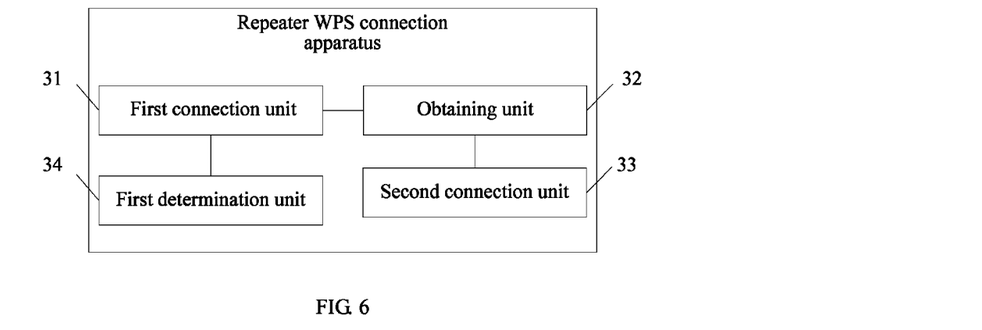
FIG. 6 is a component block diagram of another Repeater WPS connection apparatus in Embodiment 3 of the present invention.

Furthermore, optionally, as shown in FIG. 6, the Repeater WPS connection apparatus further includes a first determination unit 34.

The first determination unit 34 is configured to determine a WPS working manner when the WPS button on the wireless Repeater device is activated, where the WPS working manner includes a Client mode and an AP-Client mode.

The first connection unit 31 is further configured to: when the first determination unit 34 determines that the WPS working manner is the Client mode, enable a WPS negotiation of the Client side of the Repeater device, and establish the connection between the Client side of the Repeater device and the uplink AP device. The enabling the WPS negotiation of the Client side of the Repeater device is enabling an interconnection operation between the Client side of the Repeater device and the uplink AP device.

The first connection unit 31 is further configured to: when the first determination unit 34 determines that the WPS working manner is the AP-Client mode, enable both the WPS negotiation of the Client side and the WPS negotiation of the AP side of the Repeater device at the same time; and if the Repeater device side first identifies an uplink AP device that intends to perform a connection, disable the WPS negotiation of the Client side of the Repeater device and establish the connection between the Client side of the Repeater device and the uplink AP device. The enabling the WPS negotiation of the AP side of the Repeater device enables an interconnection operation between the AP side of the Repeater device and the STA device. The STA device that intends to perform a connection is an STA device which prepares to be connected to the AP side of the Repeater device.

Figure 7:
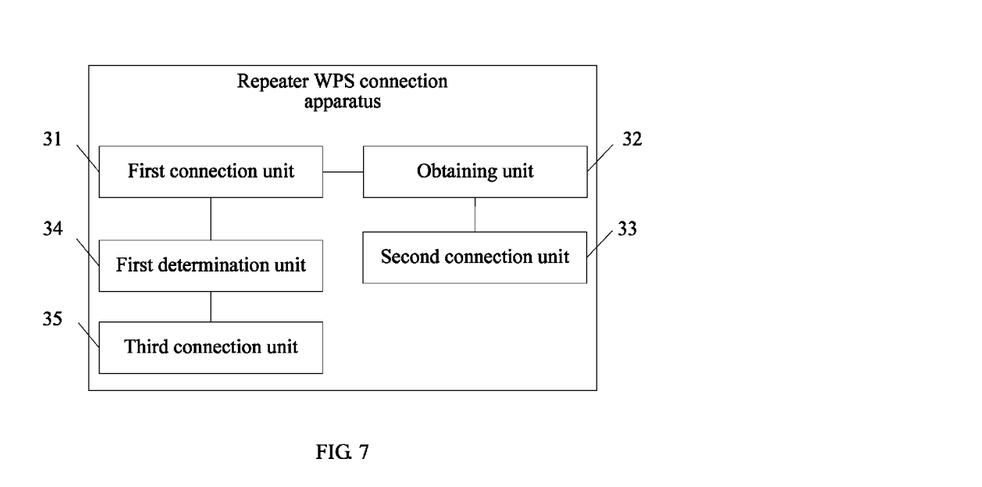
FIG. 7 is a component block diagram of another Repeater WPS connection apparatus in Embodiment 3 of the present invention.

Furthermore, optionally, as shown in FIG. 7, the Repeater WPS connection apparatus further includes a third connection unit 35.

The third connection unit 35 is configured to: when the first determination unit 34 determines that the WPS working manner is the AP-Client mode and if the AP side of the Repeater device first identifies an STA device that intends to perform a connection, disable the WPS negotiation of the Client side of the Repeater device, restore the connection between the Client side of the Repeater device and the uplink AP device, and establish a connection between the AP side of the Repeater device and the STA device. It should be noted that, when the WPS working manner is the AP-Client mode and after the WPS negotiation of the Client side of the Repeater device is enabled, the Client side of the Repeater device is disconnected from an original uplink AP device and then attempts to be connected to another uplink AP device. At this time, if it is first detected that the AP side of the Repeater device has WPS connection interaction with the STA device, the connection between the Client side of the Repeater device and the original uplink AP device needs to be restored, to ensure that, after the AP side of the Repeater device is successfully connected to the STA device, the STA device may immediately communicate with the uplink AP through the Repeater device.

Figure 8:
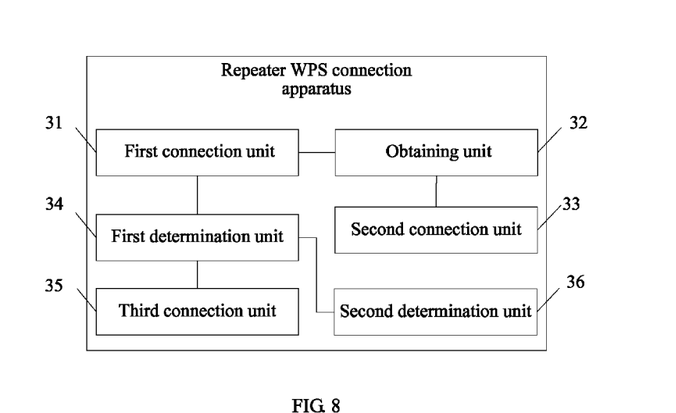
FIG. 8 is a component block diagram of another Repeater WPS connection apparatus in Embodiment 3 of the present invention.

Furthermore, optionally, as shown in FIG. 8, the Repeater WPS connection apparatus further includes a second determination unit 36.

The second determination unit 36 is configured to set the WPS working manner according to an authentication mode of a Repeater access device.

Figure 9:
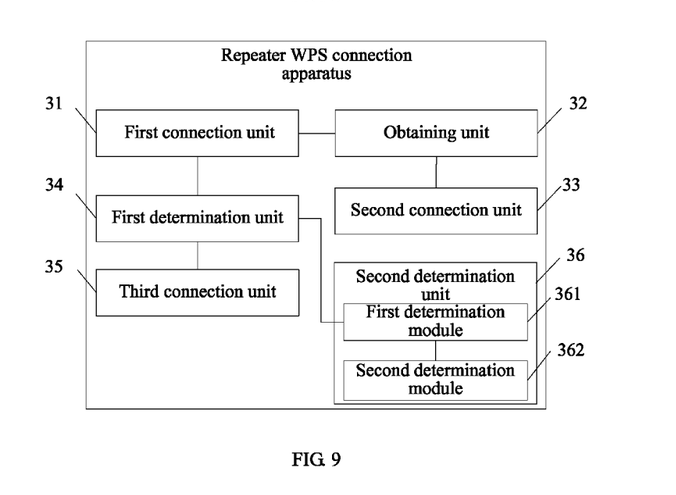
FIG. 9 is a component block diagram of another Repeater WPS connection apparatus in Embodiment 3 of the present invention.

Furthermore, optionally, as shown in FIG. 9, the second determination unit 36 further includes a first determination module 361 and a second determination module 362.

The first determination module 361 is configured to determine, according to the authentication mode of the Repeater access device, whether the Repeater access device supports the WPS. That the first determination module 361 determines, according to the authentication mode of the Repeater access device, whether the Repeater access device supports the WPS is: when the authentication mode of the Repeater access device is a WAP-PSK mode or a WPA2-PSK mode, determining that the Repeater access device supports the WPS.

The second determination module 362 is configured to: when the first determination module 361 determines that the Repeater access device supports the WPS, set the WPS working manner to the AP-Client mode.

The second determination module 362 is further configured to: when the first determination module 361 determines that the Repeater access device does not support the WPS, set the WPS working manner to the Client mode.

In the embodiment of the present invention, when a WPS button on a wireless Repeater device is activated, and it is determined that a WPS working manner is a Client mode, or it is determined that the WPS working manner is the AP-Client mode and it is detected that the Client side of the Repeater device first identifies an uplink AP device that intends to perform a connection, a connection between the Client side of the Repeater device and the uplink AP device is established first and wireless configuration information of the uplink AP device is obtained. Then, the wireless configuration information is synchronized to an AP side of the Repeater device, and a connection between the AP side of the Repeater device and the STA device is established. Compared with the prior art where a WPS connection of only one side (e.g., the AP side or the Client side) of the Repeater device is established when the WPS button on the Repeater device is activated once, the embodiment of the present invention can complete the WPS connection of the Client side and the WPS connection of the AP side of the Repeater device one after another when the Repeater WPS PBC operation is performed once, thereby simplifying the flow of the WPS connection operation and making the user operation simpler and more convenient.

Furthermore, in the embodiment of the present invention, before the WPS working manner is determined, the WPS working manner may be further determined and set according to the authentication mode of the Repeater access device, thereby avoiding an operation of manually setting the WPS working manner, so as to implement the function of automatically identifying the Repeater WPS PBC working manner, thereby making the whole process more automatic and further simplifying the user operation.

Through the above description of the embodiments, it is clear to persons skilled in the art that the present invention may be accomplished by software plus necessary universal hardware, and definitely may also be accomplished by hardware, but in many cases, the software implementation is preferred. Based on this, the technical solutions of the present invention or the part that makes contributions to the prior art may be substantially embodied in the form of a software product. The computer software product is stored in a readable storage medium, for example, a floppy disk, hard disk, or optical disk of the computer, and includes several instructions used to instruct computer equipment (e.g., a personal computer, a server, or network equipment) to perform the methods according to the embodiments of the present invention.

The foregoing descriptions are merely exemplary embodiments of the present invention, but not intended to limit the present invention. Any variation or replacement made by persons skilled in the art without departing from the spirit of the present invention shall fall within the protection scope of the present invention. Therefore, the protection scope of the present invention is subject to the protection scope of the claims.

What is claimed is:

1. A repeater Wi-Fi Protected Setup (WPS) method comprising:
   establishing a connection between a client side of a wireless repeater device and an uplink access point (AP) device when a WPS button on the wireless repeater device is activated;
   obtaining wireless configuration information of the uplink AP device;
   synchronizing the wireless configuration information to an AP side of the wireless repeater device;
   enabling a WPS negotiation of the AP side of the wireless repeater device; and
   establishing a connection between the AP side of the wireless repeater device and an enrollee station (STA) device,
   wherein the connection between the client side of the wireless repeater device and the uplink AP device and the connection between the AP side of the wireless repeater device and the enrollee STA device are established one after another when the WPS button on the wireless repeater device is activated once.

2. The method according to claim 1, further comprising setting a WPS working manner according to an authentication mode of a repeater access device.

3. A repeater Wi-Fi Protected Setup (WPS) method comprising:
   establishing a connection between a client side of a wireless repeater device and an uplink access point (AP) device when a WPS button on the wireless repeater device is activated;
   obtaining wireless configuration information of the uplink AP device;
   synchronizing the wireless configuration information to an AP side of the wireless repeater device;
   enabling a WPS negotiation of the AP side of the wireless repeater device;
   establishing a connection between the AP side of the wireless repeater device and an enrollee station (STA) device; and
   determining a WPS working manner of the wireless repeater device when the WPS button on the wireless repeater device is activated,
   wherein the WPS working manner comprises a client mode or an AP-client mode,
   wherein establishing the connection between the client side of the wireless repeater device and the uplink AP device comprises enabling a WPS negotiation of the client side of the wireless repeater device and establishing the connection between the client side of the wireless repeater device and the uplink AP device when the WPS working manner is the client mode,
   wherein establishing the connection between the client side of the wireless repeater device and the uplink AP device comprises enabling both a WPS negotiation of the client side and the WPS negotiation of the AP side of the wireless repeater device at a same time when the WPS working manner is the AP-client mode, and
   wherein establishing the connection between the client side of the wireless repeater device and the uplink AP device comprises disabling the WPS negotiation of the AP side of the wireless repeater device and establishing the connection between the client side of the wireless repeater device and the uplink AP device when the client side of the wireless repeater device identifies that the uplink AP device intends to perform the connection first.

4. The method according to claim 3, wherein the WPS working manner comprises the AP-client mode, and wherein the method further comprises disabling a WPS negotiation of the client side of the wireless repeater device, restoring the connection between the client side of the repeater device and the uplink AP device, and establishing a connection between the AP side of the wireless repeater device and the STA device when the AP side of the wireless repeater device identifies that the STA device intends to perform the connection first.

5. A repeater Wi-Fi Protected Setup (WPS) method comprising:
   establishing a connection between a client side of a wireless repeater device and an uplink access point AP device when a WPS button on the wireless repeater device is activated;
   obtaining wireless configuration information of the u link AP device;
   synchronizing the wireless configuration information to an AP side of the wireless repeater device;
   enabling a WPS negotiation of the AP side of the wireless repeater device;
   establishing a connection between the AP side of the wireless repeater device and an enrollee station (STA) device; and
   setting a WPS working manner according to an authentication mode of a repeater access device,
   wherein setting the WPS working manner according to the authentication mode of the repeater access device comprises:
      determining, according to the authentication mode of the repeater access device, whether the repeater access device supports a WPS;
      setting the WPS working manner to the AP-client mode when the repeater access device supports the WPS; and
      setting the WPS working manner to the client mode when the repeater access device does not support the WPS.

6. The method according to claim 5, wherein determining, according to the authentication mode of the repeater access device, whether the repeater access device supports the WPS comprises determining that the repeater access device supports the WPS when the authentication mode of the repeater access device is a Wi-Fi Protected Access Pre-Shared Key (WPA-PSK) mode or a Wi-Fi Protected Access II (WPA2-PSK) mode.

7. A repeater Wi-Fi Protected Setup (WPS) connection apparatus comprising:
   a first connection unit configured to establish a connection between a client side of a repeater device and an uplink access point (AP) device when a WPS button on the repeater device is activated;

an obtaining unit configured to obtain wireless configuration information of the uplink AP device; and a second connection unit configured to synchronize the wireless configuration information obtained by the obtaining unit to an AP side of the repeater device, enable a WPS negotiation of the AP side of the repeater device, and establish a connection between the AP side of the repeater device and a station (STA) device, wherein the connection between the client side of the repeater device and the uplink AP device and the connection between the AP side of the repeater device and the STA device are established one after another when the WPS button on the repeater device is activated once.

8. The apparatus according to claim 7, further comprising a second determination unit configured to set the WPS working manner according to an authentication mode of a repeater access device.

9. A repeater Wi-Fi Protected Setup (WPS) connection apparatus comprising:

a first connection unit configured to establish a connection between a client side of a repeater device and an uplink access point (AP) device when a WPS button on the repeater device is activated;

an obtaining unit configured to obtain wireless configuration information of the uplink AP device;

a second connection unit configured to synchronize the wireless configuration information obtained by the obtaining unit to an AP side of the repeater device, enable a WPS negotiation of the AP side of the repeater device, and establish a connection between the AP side of the repeater device and a station (STA) device; and a first determination unit configured to determine a WPS working manner when the WPS button on the wireless repeater device is activated, wherein the WPS working manner comprises a client mode or an AP-client mode, wherein the first connection unit is further configured to enable a WPS negotiation of the client side of the repeater device and establish the connection between the client side of the repeater device and the uplink AP device when the first determination unit determines that the WPS working manner is the client mode, wherein the first connection unit is further configured to enable both a WPS negotiation of the client side and the WPS negotiation of the AP side of the repeater device at a same time when the first determination unit determines that the WPS working manner is the AP-client mode, and wherein the first connection unit is further configured to disable the WPS negotiation of the client side of the repeater device and establish the connection between the client side of the repeater device and the uplink AP device when the repeater device side identifies that the uplink AP device intends to perform a connection first.

10. The apparatus according to claim 9, further comprising a third connection unit configured to disable the WPS negotiation of the client side of the repeater device, restore the connection between the client side of the repeater device and the uplink AP device, and establish the connection between the AP side of the repeater device and the STA device when the first determination unit determines that the WPS working manner is the AP-client mode and the AP side of the repeater device identifies that the STA device intends to perform a connection first.

11. A repeater Wi-Fi Protected Setup (WPS) connection apparatus comprising:

a first connection unit configured to establish a connection between a client side of a repeater device and an uplink access point (AP) device when a WPS button on the repeater device is activated;

an obtaining unit configured to obtain wireless configuration information of the uplink AP device;

a second connection unit configured to synchronize the wireless configuration information obtained by the obtaining unit to an AP side of the repeater device, enable a WPS negotiation of the AP side of the repeater device, and establish a connection between the AP side of the repeater device and a station (STA) device;

a second determination unit configured to set the WPS working manner according to an authentication mode of a repeater access device, wherein the second determination unit comprises:

a first determination module configured to determine, according to the authentication mode of the repeater access device, whether the repeater access device supports a WPS; and a second determination module configured to set the WPS working manner to the AP-client mode when the first determination module determines that the repeater access device supports the WPS, and wherein the second determination module is further configured to set the WPS working manner to the client mode when the first determination module determines that the repeater access device does not support the WPS.

12. The apparatus according to claim 11, wherein the first determination module is configured to determine that the repeater access device supports the WPS when the authentication mode of the repeater device is a WPA-PSK mode or a WPA2-PSK mode.

* * * * *

UNITED STATES PATENT AND TRADEMARK OFFICE
CERTIFICATE OF CORRECTION

PATENT NO.        : 8,929,276 B2                                    Page 1 of 1
APPLICATION NO.   : 13/720658
DATED             : January 6, 2015
INVENTOR(S)       : Wei Du and Weihong Wang

It is certified that error appears in the above-identified patent and that said Letters Patent is hereby corrected as shown below:

In the Claims

Column 10, lines 25-53, Claim 5 should read:

A repeater Wi-Fi Protected Setup (WPS) method comprising:
establishing a connection between a client side of a wireless repeater device and an uplink access point (AP) device when a WPS button on the wireless repeater device is activated;
obtaining wireless configuration information of the uplink AP device;
synchronizing the wireless configuration information to an AP side of the wireless repeater device;
enabling a WPS negotiation of the AP side of the wireless repeater device;
establishing a connection between the AP side of the wireless repeater device and an enrollee station (STA) device; and
setting a WPS working manner according to an authentication mode of a repeater access device,
wherein setting the WPS working manner according to the authentication mode of the repeater access device comprises:
determining, according to the authentication mode of the repeater access device, whether the repeater access device supports a WPS;
setting the WPS working manner to the AP-client mode when the repeater access device supports the WPS; and
setting the WPS working manner to the client mode when the repeater access device does not support the WPS.

Signed and Sealed this
Twelfth Day of May, 2015

Michelle K. Lee
*Director of the United States Patent and Trademark Office*